United States Patent
Mizuno et al.

(10) Patent No.: US 10,108,107 B2
(45) Date of Patent: Oct. 23, 2018

(54) DRIVING MECHANISM THAT CONTROLS STATE OF MOTION CONVERSION MECHANISM IN DESIRED STATE, AND IMAGE FORMING APPARATUS INCLUDING THE SAME

(71) Applicant: KYOCERA Document Solutions Inc., Osaka (JP)

(72) Inventors: Masahiko Mizuno, Osaka (JP); Nobuyuki Fuchimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/461,972

(22) Filed: Mar. 17, 2017

(65) Prior Publication Data

US 2017/0285519 A1    Oct. 5, 2017

(30) Foreign Application Priority Data

Apr. 4, 2016 (JP) ................................ 2016-074873

(51) Int. Cl.
*G03G 15/01* (2006.01)
*G03G 15/08* (2006.01)
(Continued)

(52) U.S. Cl.
CPC ......... *G03G 15/0865* (2013.01); *F16D 41/12* (2013.01); *F16H 25/14* (2013.01);
(Continued)

(58) Field of Classification Search
CPC .................................................. G03G 15/1615
See application file for complete search history.

(56) References Cited

U.S. PATENT DOCUMENTS

| 5,863,036 A * | 1/1999 | Tanaka ................. B65H 3/0661 |
| | | 271/10.11 |
| 2007/0177899 A1 | 8/2007 | Kawamura .................... 399/223 |

(Continued)

FOREIGN PATENT DOCUMENTS

JP    2006-133330 A    5/2006

OTHER PUBLICATIONS

Extended European Search Report dated Aug. 18, 2017, issued by the European Patent Office in corresponding application EP 17164517.9.

*Primary Examiner* — Ryan Walsh
(74) *Attorney, Agent, or Firm* — Stein IP, LLC

(57) ABSTRACT

A driving mechanism includes a first gear mechanism, a motion conversion mechanism, an actuator, and a mechanical clutch. The mechanical clutch includes an input gear that includes a plurality of engaging portions engageable with a displaced portion on a first position. The mechanical clutch switches to a connected state and a non-connected state corresponding to whether or not the engaging portions each engage with the displaced portion of the actuator. The connected state is a state where the rotational power of the first gear mechanism is transmitted to the motion conversion mechanism. The non-connected state is a state where the rotational power of the first gear mechanism is not transmitted to the motion conversion mechanism. The plurality of engaging portions are formed on a plurality of positions within a range of a default center angle less than 180 degrees in a circumferential direction of the input gear.

3 Claims, 9 Drawing Sheets

(51) Int. Cl.
  *F16D 41/12*   (2006.01)
  *F16H 25/14*   (2006.01)
  *G03G 21/16*   (2006.01)
  *G03G 15/16*   (2006.01)
  *G03G 21/18*   (2006.01)

(52) U.S. Cl.
  CPC ......... *G03G 15/1615* (2013.01); *G03G 21/16* (2013.01); *G03G 21/1857* (2013.01); *G03G 15/0887* (2013.01); *G03G 21/1647* (2013.01); *G03G 21/1676* (2013.01); *G03G 2215/0103* (2013.01); *G03G 2221/1657* (2013.01)

(56) References Cited

U.S. PATENT DOCUMENTS

| | | | |
|---|---|---|---|
| 2012/0251184 A1* | 10/2012 | Hashimoto | G03G 15/0136 399/223 |
| 2013/0237366 A1* | 9/2013 | Yasuda | G03G 15/0189 475/280 |
| 2014/0294476 A1* | 10/2014 | Hashimoto | G03G 15/234 399/361 |
| 2016/0062272 A1 | 3/2016 | Fujiwara | |
| 2016/0091838 A1* | 3/2016 | Mizuno | G03G 15/1615 399/167 |
| 2017/0146942 A1* | 5/2017 | Mizuno | F16H 1/20 |
| 2017/0152116 A1* | 6/2017 | Hashimoto | B65H 3/0669 |
| 2017/0275110 A1* | 9/2017 | Hashimoto | B65H 3/0669 |

* cited by examiner

DRIVING MECHANISM THAT CONTROLS STATE OF MOTION CONVERSION MECHANISM IN DESIRED STATE, AND IMAGE FORMING APPARATUS INCLUDING THE SAME

INCORPORATION BY REFERENCE

This application is based upon, and claims the benefit of priority from, corresponding Japanese Patent Application No. 2016-074873 filed in the Japan Patent Office on Apr. 4, 2016, the entire contents of which are incorporated herein by reference.

BACKGROUND

Unless otherwise indicated herein, the description in this section is not prior art to the claims in this application and is not admitted to be prior art by inclusion in this section.

Generally, a typical tandem type image forming apparatus includes a plurality of photoreceptors and a plurality of developing units. The plurality of developing units develop respective plurality of electrostatic latent images on the photoreceptors as black toner images and a plurality of other colored toner images.

The toner images on the plurality of photoreceptors are transferred on an intermediate transfer belt, and furthermore, the toner images on the intermediate transfer belt are transferred on a sheet. The plurality of colored toner images are toner images of three colors of cyan, magenta, and yellow.

The plurality of developing units each include rotating units such as a developing roller and a stirring unit that stirs a toner. In the image forming apparatus, when image formations are performed in a color mode, every rotating unit of the developing units is driven.

On the other hand, it has been known that, when the image formations are performed in a monochrome mode, the rotating units are halted in the three developing units that perform the development of the colored toner images for preventing a deterioration of the toner.

SUMMARY

A driving mechanism according to one aspect of the disclosure includes a first gear mechanism, a motion conversion mechanism, an actuator, and a mechanical clutch. The first gear mechanism is connected to a motor to transmit a rotational power of the motor to a first drive target. The motion conversion mechanism converts a rotational motion with one rotation of the first gear mechanism to a reciprocation motion with one reciprocation when the motion conversion mechanism receives the rotational power from the first gear mechanism. The motion conversion mechanism transmits a power of the reciprocation motion to a reciprocatingly displaceable reciprocation drive target. The actuator includes a displaceable displaced portion. The actuator displaces the displaced portion to a first position and a second position corresponding to an input control signal. The mechanical clutch includes an input gear. The input gear rotates by receiving the rotational power from the first gear mechanism. The input gear includes a plurality of engaging portions engageable with the displaced portion on the first position. The mechanical clutch switches to a connected state and a non-connected state corresponding to whether or not the engaging portions each engage with the displaced portion of the actuator. The connected state is a state where the rotational power of the first gear mechanism is transmitted to the motion conversion mechanism. The non-connected state is a state where the rotational power of the first gear mechanism is not transmitted to the motion conversion mechanism. The plurality of engaging portions are formed on a plurality of positions within a range of a default center angle less than 180 degrees in a circumferential direction of the input gear.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
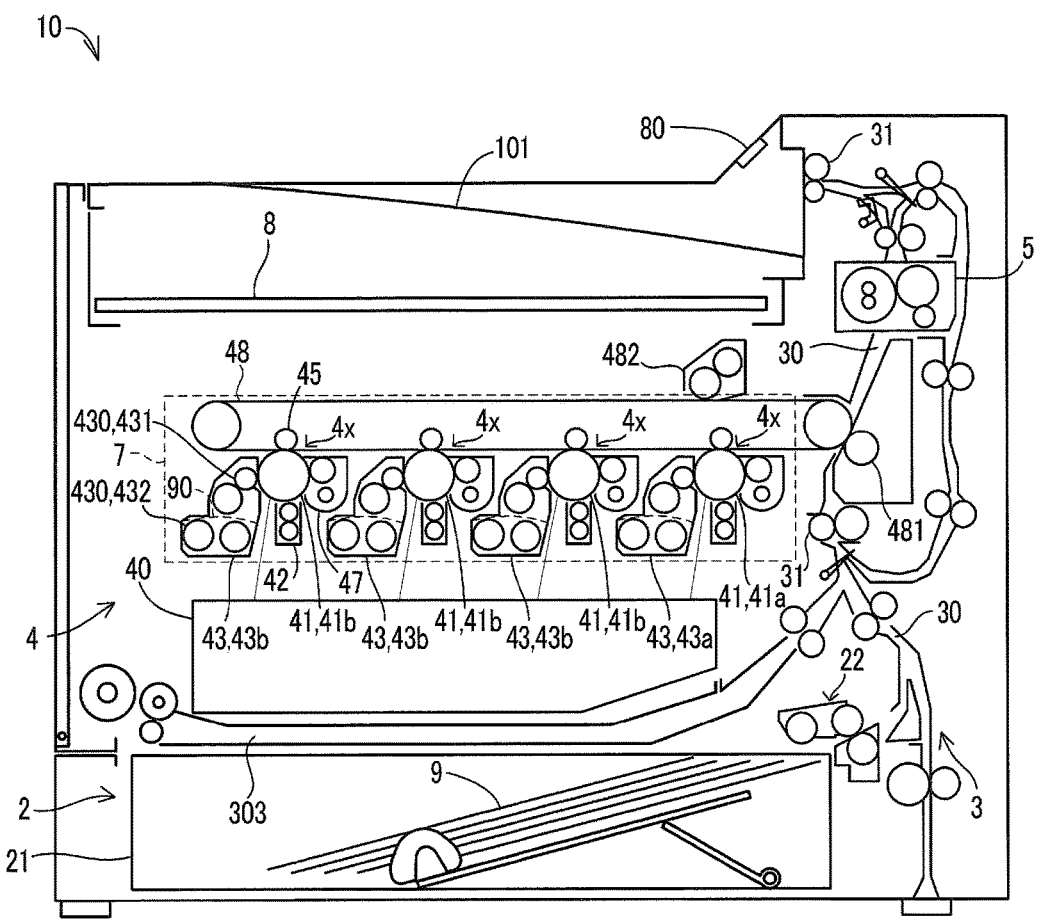
FIG. 1 illustrates a configuration of an image forming apparatus including a driving mechanism according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure by referring to attached drawings. The following embodiments are merely exemplary embodiments according to the disclosure and not intended to limit the technical scope of the disclosure.

Configuration of Image Forming Apparatus 10

First, with reference to FIG. 1, an overall configuration of an image forming apparatus 10 of a driving mechanism 7 according to the embodiment will be described.

The image forming apparatus 10 is an electrophotographic method image forming apparatus that forms an image on a sheet 9. The sheet 9 is a sheet-shaped image forming medium, for example, a paper sheet, an envelope, and an OHP sheet.

The image forming apparatus 10 includes a sheet feeding unit 2, a sheet conveyance unit 3, an image forming unit 4, a fixing unit 5, the driving mechanism 7, a control unit 8, an operation display 80, and similar unit. The control unit 8 controls the sheet feeding unit 2, the sheet conveyance unit 3, the image forming unit 4, the fixing unit 5, the driving mechanism 7, and similar unit. The image forming unit 4 includes a light scanning unit 40. The driving mechanism 7 drives mechanically operating parts such as a rotator included in the image forming unit 4.

The operation display 80 is equipment as a user interface. The operation display 80 includes an operation unit that accepts operations of a user and a display that indicates information to be presented to the user. For example, the operation unit is a touch panel, an operation button, or similar unit, and the display is such as a liquid crystal display.

The image forming apparatus 10 illustrated in FIG. 1 is a tandem type image forming apparatus, and is a color printer. Therefore, the image forming unit 4 includes a plurality of single color image forming units 4x, corresponding to respective colors of cyan, magenta, yellow, and black, an intermediate transfer belt 48, a secondary transfer unit 481, and a secondary cleaning unit 482.

The sheet feeding unit 2 includes a sheet delivering unit 22 that sends out the sheet 9 housed in a sheet cassette 21 to a conveyance path 30.

The sheet conveyance unit 3 includes a plurality of conveyance rollers 31 each of which feeds the sheet 9 along the conveyance path 30. Furthermore, the conveyance roller 31 located on an outlet of the conveyance path 30 discharges the sheet 9 after the image formation from the conveyance path 30 to a discharge tray 101.

On each of the single color image forming units 4x, a drum-shaped photoreceptor 41 rotates and a charging unit 42 evenly charges a surface of the photoreceptor 41. Furthermore, the light scanning unit 40 exposes an electrostatic latent image on the surface of the photoreceptor 41, and a developing unit 43 develops the electrostatic latent image on the surface of the photoreceptor 41 with a toner 90. This forms a toner image on the surface of the photoreceptor 41. The photoreceptor 41 is an exemplary image carrier.

That is, the image forming unit 4 includes a plurality of photoreceptors 41, a plurality of developing units 43, and the light scanning unit 40. In the image forming unit 4, the light scanning unit 40 forms the electrostatic latent image on each surface of the rotating photoreceptors 41, and further, the developing unit 43 develops the electrostatic latent image as the toner image.

The single color image forming units 4x each include a primary transfer unit 45 that transfers the toner image from the surface of the photoreceptor 41 to the intermediate transfer belt 48. The intermediate transfer belt 48 is a rotatably supported endless belt. A primary cleaning unit 47 removes the toner 90 remaining on the surface of the photoreceptor 41.

The intermediate transfer belt 48 rotates in a state of contacting the photoreceptor 41, thus transferring the toner image on the photoreceptor 41 to the intermediate transfer belt 48. When the intermediate transfer belt 48 contacts every photoreceptor 41, the toner images on the plurality of photoreceptors 41 are transferred on the intermediate transfer belt 48 as a color image.

On the conveyance path 30, the secondary transfer unit 481 transfers the toner image formed on the intermediate transfer belt 48 on the sheet 9. The secondary cleaning unit 482 removes the toner 90 remaining on the intermediate transfer belt 48.

On the conveyance path 30, the fixing unit 5 heats the toner image on the sheet 9, so as to fix the toner image on the sheet 9.

Figure 2:
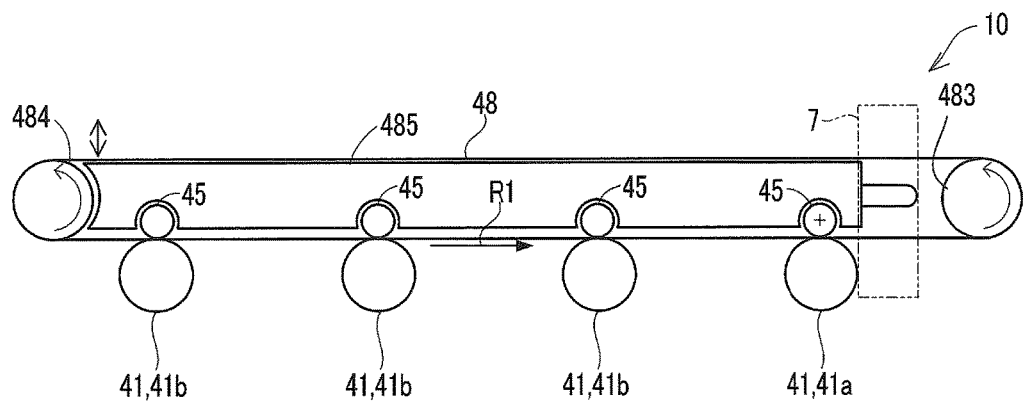
FIG. 2 illustrates a configuration of an intermediate transfer belt and photoreceptors when the driving mechanism according to the one embodiment is in a first state.
Figure 3:
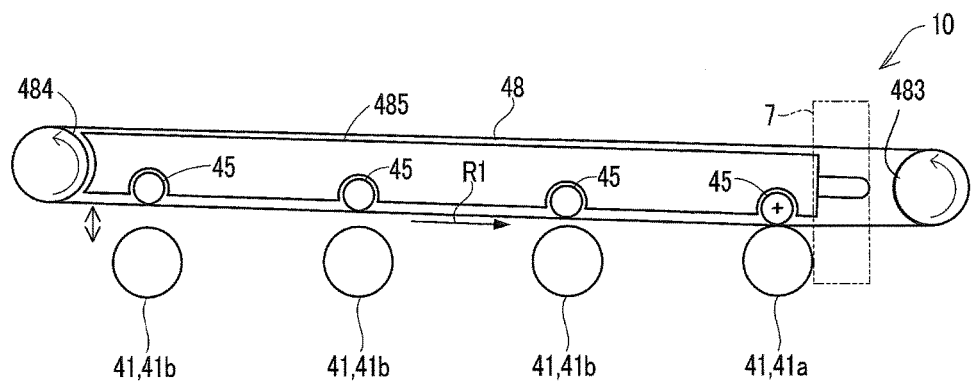
FIG. 3 illustrates a configuration of the intermediate transfer belt and the photoreceptors when the driving mechanism according to the one embodiment is in a second state.

As illustrated in FIGS. 2 and 3, the driving mechanism 7 described later changes the positional relationship between the intermediate transfer belt 48 and the plurality of photoreceptors 41.

Figure 4:
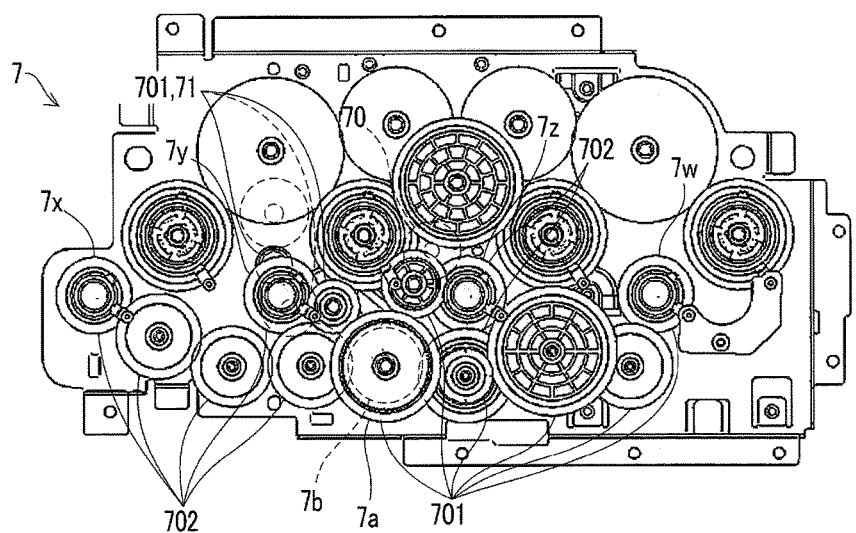
FIG. 4 illustrates a configuration of the driving mechanism according to the one embodiment.
Figure 5:
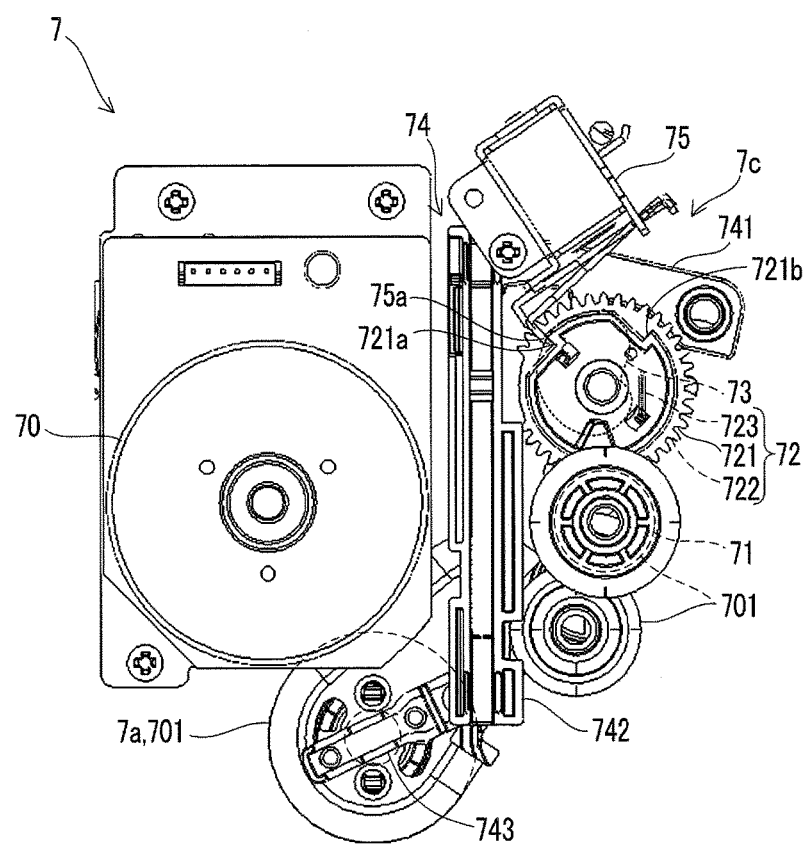
FIG. 5 illustrates a motion conversion mechanism and its peripheral portion in a front view when the driving mechanism according to the one embodiment is in the first state.

The driving mechanism 7 is a mechanism that transmits a rotational power of one motor 70 to rotating units 430 included in the respective plurality of developing units 43 (see FIGS. 1, 4, and 5). That is, the motor 70 is a driving source shared by the plurality of developing units 43. The rotating unit 430 of the developing unit 43 includes a developing roller 431 that supplies the photoreceptor 41 with the toner 90, a stirring unit 432 that stirs the toner 90, and similar unit.

Furthermore, the driving mechanism 7 is also a mechanism configured to execute a color positioning operation and a monochrome positioning operation. The color positioning operation is an operation to position the intermediate transfer belt 48 on a color position where the intermediate transfer belt 48 contacts every photoreceptor 41 (see FIG. 2). The monochrome positioning operation is an operation to position the intermediate transfer belt 48 on a position where the intermediate transfer belt 48 contacts only a regular use photoreceptor 41a as one predetermined photoreceptor 41 (see FIG. 3).

In this embodiment, the regular use photoreceptor 41a is the photoreceptor 41 on which the toner image is formed in black. In FIGS. 2 and 3, a belt moving direction R1 indicates a moving direction of a surface opposing the plurality of photoreceptors 41 on the intermediate transfer belt 48. The regular use photoreceptor 41a is the photoreceptor 41 arranged on a most downstream of the belt moving direction R1.

In the following description, all the photoreceptors 41 excluding the regular use photoreceptor 41a is referred to as other photoreceptors 41b. That is, the other photoreceptors 41b are the three photoreceptors 41 on which the respective toner images of cyan, magenta, and yellow are formed.

The developing unit 43 that performs the development on the regular use photoreceptor 41a is referred to as a regular use developing unit 43a, and the developing units 43 that perform the development on the other photoreceptor 41b are referred to as other developing units 43b.

In this embodiment, among the plurality of developing units 43, the regular use developing unit 43a is one developing unit that performs the development of the black toner image, and the other developing units 43b are other three developing units that perform the developments of the colored toner images.

As illustrated in FIGS. 2 and 3, the intermediate transfer belt 48 is supported by a first supporting roller 483 and a second supporting roller 484. The first supporting roller 483 and the second supporting roller 484 are respectively located on a downstream and an upstream of the belt moving direction R1. The intermediate transfer belt 48 is supported by a support frame 485, which supports the second supporting roller 484, so as to be displaceable between the color position and the monochrome position.

The driving mechanism 7 turns the support frame 485 within a turning range predetermined with the position of the primary transfer unit 45 corresponding to the regular use photoreceptor 41a as the center. This causes the driving mechanism 7 to position the intermediate transfer belt 48 on each of the color position and the monochrome position.

The control unit 8 chooses any of the color mode and the monochrome mode as the operation mode of the image formation in accordance with the operation on the operation unit of the operation display 80.

When the image formation is performed in the color mode, the control unit 8 controls the driving mechanism 7 to make the rotating unit 430 of every developing unit 43 operate. At this time, the driving mechanism 7 executes the color positioning operation.

On the other hand, when the image formation is performed in the monochrome mode, the control unit 8 controls the driving mechanism 7 to make the rotating unit 430 of only the regular use developing unit 43a among the plurality of developing units 43 operate. At this time, the driving mechanism 7 executes the monochrome positioning operation.

That is, in the monochrome mode, the control unit 8 halts the rotating units 430 of the other developing units 43b, which perform the developments of the colored toner images, for preventing the deterioration of the toner 90.

Now, a conventional apparatus sometimes includes one motor 70 that drives the rotating units 430 of the plurality of developing units 43. The driving mechanism of the conventional apparatus driving the plurality of developing units 43 employs a clutch where a state is switched to the color mode and the monochrome mode.

The conventional apparatus sometimes employs a mechanism where the clutch is combined with a motion conversion mechanism as the driving mechanism so as to avoid a large load to be applied on the clutch. The motion conversion mechanism of the conventional apparatus is a mechanism that converts a rotational motion of a primary side gear mechanism transmitting the power of the motor 70 to a reciprocation motion, and includes one or both of a cam mechanism and a link mechanism. The motion conversion mechanism displaces a relay unit, which relays the primary side gear mechanism and a secondary side gear mechanism transmitting the rotational power to the load on such as the developing unit 43, between an operation position, where both sides are connected, and a retracted position where the connection of both sides is released.

Generally, the conventional apparatus employs an electromagnetic clutch or a one-rotation clutch as the clutch. The electromagnetic clutch is switched from one to another of the connected state and the non-connected state in accordance with a control signal.

The one-rotation clutch is a mechanical clutch combined with an actuator such as a solenoid type actuator for use. When an engaging portion of the one-rotation clutch engages with a displaced portion of the actuator, the one-rotation clutch is switched from the connected state to the non-connected state. When the engagement of the engaging portion of the one-rotation clutch with the displaced portion of the actuator is released, the one-rotation clutch is switched from the non-connected state to the connected state.

When the conventional apparatus employs the electromagnetic clutch or the one-rotation clutch with the motion conversion mechanism, a sensor for obtaining a state of the motion conversion mechanism is required so as to control the state of the motion conversion mechanism to a desired state. For example, the sensor detects the position of such as the relay unit displaced by the motion conversion mechanism.

However, the sensor is sometimes required to be omitted due to a limitation of space and a limitation of cost. When the electromagnetic clutch is employed, an accuracy of the sensor and a time resolution of an output of a control signal to the electromagnetic clutch influence an accuracy of the positioning of a target that the motion conversion mechanism reciprocatingly displaces. Therefore, when a high positioning accuracy is required in the motion conversion mechanism, the electromagnetic clutch sometimes cannot be employed.

On the other hand, as described later, the driving mechanism 7 employs a mechanical clutch 72 with a motion conversion mechanism 7c (see such as FIGS. 5 and 6). However, the driving mechanism 7 is a mechanism configured to control a state of the motion conversion mechanism 7c to a desired state without a sensor for obtaining the state of the motion conversion mechanism 7c. The following describes the driving mechanism 7 in detail.

Driving Mechanism 7

As illustrated in FIG. 4, the driving mechanism 7 includes a first gear mechanism 701, a relay gear 7b, and a second gear mechanism 702. Further, as illustrated in FIGS. 5 and 6, the driving mechanism 7 includes the mechanical clutch 72, an actuator 75, and the motion conversion mechanism 7c. The motion conversion mechanism 7c includes a cam 73 and a link mechanism 74.

The first gear mechanism 701 is a gear mechanism that is constantly connected to the motor 70. The first gear mechanism 701 transmits the rotational power of the motor 70 to the rotating unit 430 of the regular use developing unit 43a as a first drive target. The rotating unit 430 of the regular use developing unit 43a is an exemplary first drive target.

As illustrated in FIG. 4, the first gear mechanism 701 includes a first developing connecting gear 7w that transmits the rotational power to the rotating unit 430 of the regular use developing unit 43a. Furthermore, the first gear mechanism 701 also includes a relay output gear 7a coaxially supported with the relay gear 7b. The first gear mechanism 701 includes a conversion output gear 71 that transmits the rotational power to the mechanical clutch 72 (see FIG. 5).

The relay gear 7b is a rotator rotatably supported and reciprocatingly displaceable between a connected position where the relay gear 7b receives the rotational power from the relay output gear 7a of the first gear mechanism 701 to rotate and a disconnected position where the relay gear 7b does not receive the rotational power from the relay output gear 7a.

Figure 8:
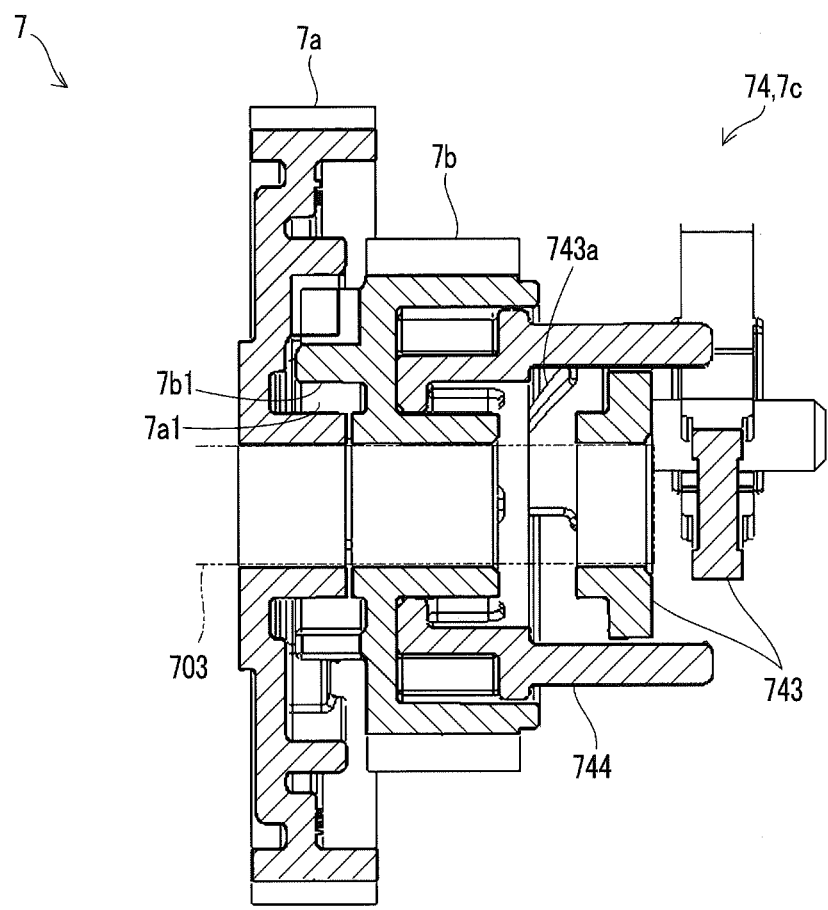
FIG. 8 illustrates a cross section of a connected rotator and its peripheral portion when the driving mechanism according to the one embodiment is in the first state.
Figure 9:
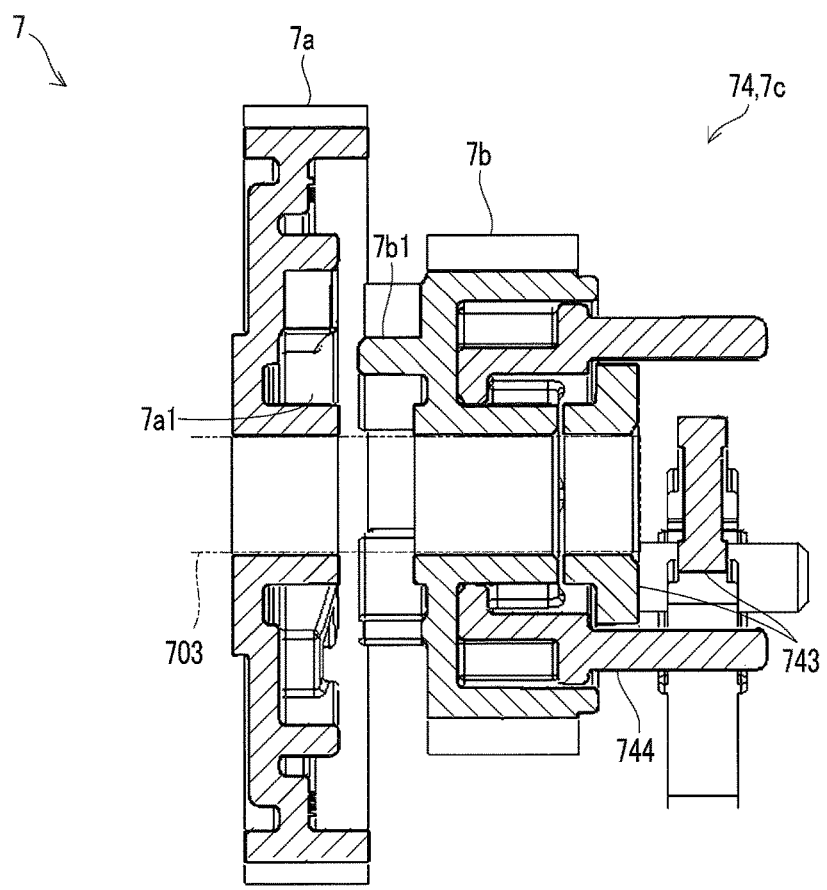
FIG. 9 illustrates a cross section of a connected rotator and its peripheral portion when the driving mechanism according to the one embodiment is in the second state.

FIG. 8 illustrates the relay gear 7b located on the connected position, and FIG. 9 illustrates the relay gear 7b located on the disconnected position. In FIGS. 8 and 9, a relay shaft 703 that rotatably supports the relay output gear 7a and the relay gear 7b is indicated by a virtual line.

The relay gear 7b is movable between the connected position and the disconnected position along the relay shaft 703. When the relay gear 7b is located on the connected position, an engaging portion 7a1 located on the relay output gear 7a engages with an engaging portion 7b1 located on the relay gear 7b (see FIG. 8). This causes the driving mechanism 7 to be in a first state where the rotational power of the relay output gear 7a is transmitted to the relay gear 7b, that is, a state of the color mode.

On the other hand, when the relay gear 7b is located on the disconnected position, the engaging portion 7b1 of the relay gear 7b separates from the engaging portion 7a1 of the relay output gear 7a (see FIG. 9). This causes the driving mechanism 7 to be in a second state where the rotational power of the relay output gear 7a is not transmitted to the relay gear 7b, that is, a state of the monochrome mode.

The second gear mechanism 702 is a gear mechanism that transmits the rotational power of the relay gear 7b to the rotating units 430 of the other developing units 43b as a second drive target. The second gear mechanism 702 is constantly connected to the relay gear 7b. The rotating unit 430 of the other developing unit 43b is an exemplary second drive target.

As illustrated in FIG. 4, the second gear mechanism 702 includes three second developing connecting gears 7x, 7y, and 7z that transmit the rotational power to three rotating units 430 of the other developing units 43b.

The motion conversion mechanism 7c is a mechanism that converts a rotational motion with one rotation of the first gear mechanism 701 to a reciprocation motion with one reciprocation when the motion conversion mechanism 7c receives the rotational power from the first gear mechanism 701. The motion conversion mechanism 7c transmits a power of the reciprocation motion to the reciprocatingly displaceable relay gear 7b. The relay gear 7b is an exemplary reciprocatingly displaceable reciprocation drive target.

Figure 10:
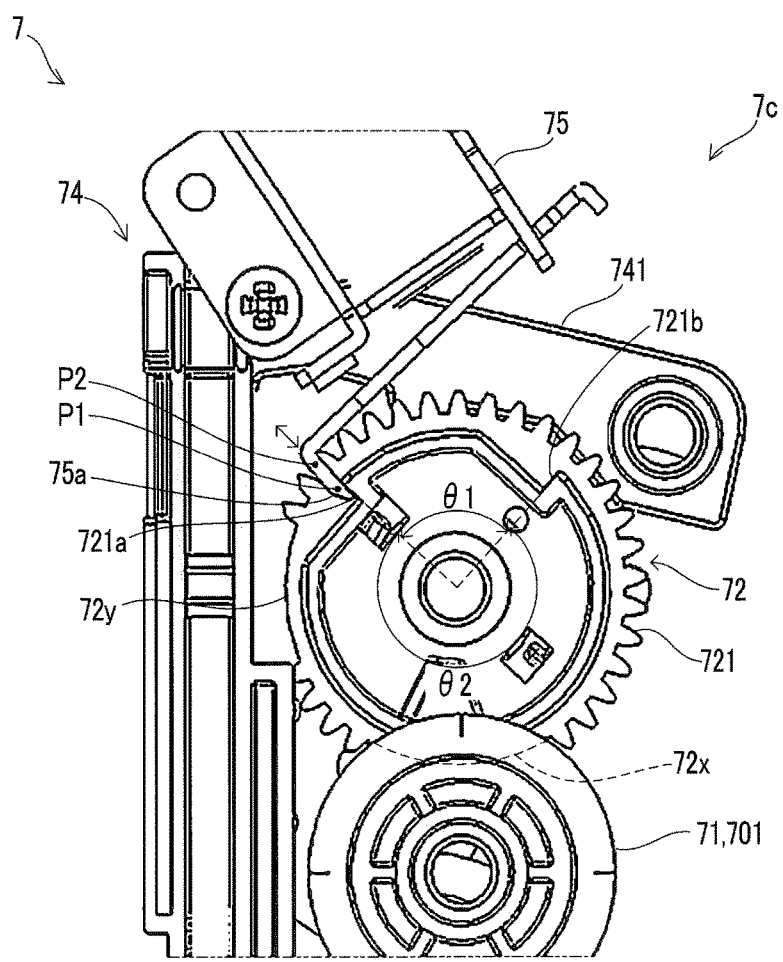
FIG. 10 illustrates a mechanical clutch and its peripheral portion in a front view when the driving mechanism according to the one embodiment is in the first state.
Figure 11:
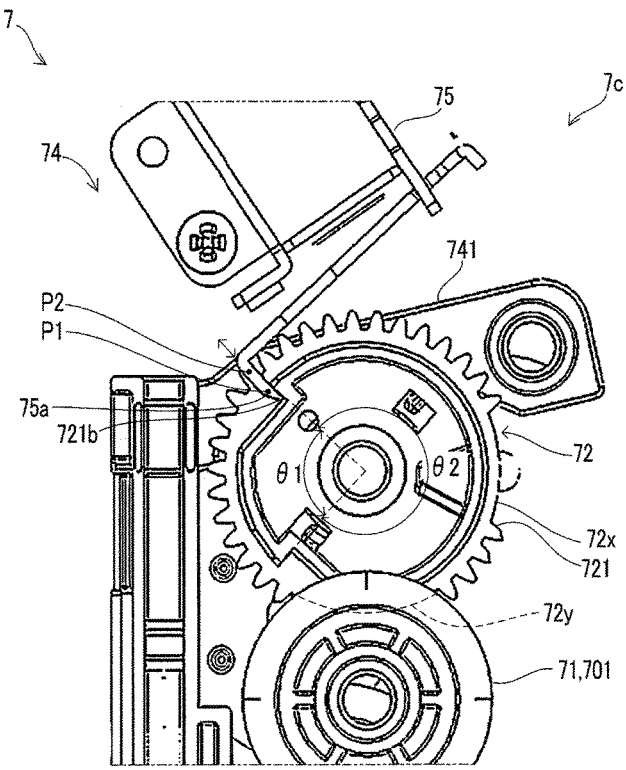
FIG. 11 illustrates the mechanical clutch and its peripheral portion in a front view when the driving mechanism according to the one embodiment is in the second state.

As illustrated in FIGS. 10 and 11, the actuator 75 includes a displaceable displaced portion 75a so as to displace the displaced portion 75a to a first position P1 and a second position P2 corresponding to an input control signal. The control unit 8 outputs the control signal to the actuator 75.

In this embodiment, a flapper solenoid as an exemplary solenoid type actuator is employed as the actuator 75.

Figure 12:
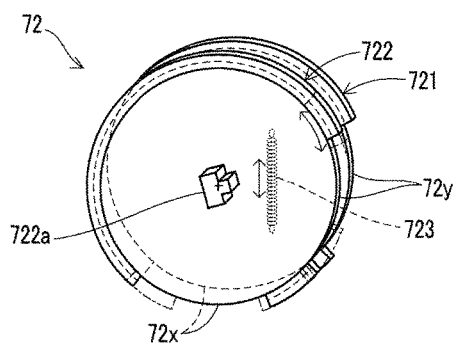
FIG. 12 illustrates a configuration of the mechanical clutch.

As illustrated in FIG. 12, the mechanical clutch 72 includes a pair of partially toothless gears 721 and 722, and a spring 723. Hereinafter, one of the pair of partially toothless gears 721 and 722 is referred to as a first partially toothless gear 721, and the other is referred to as a second partially toothless gear 722.

The first partially toothless gear 721 is connected to the second partially toothless gear 722 overlapping coaxially, so as to be rotatably supported as a whole. The first partially toothless gear 721 is connected to the second partially toothless gear 722 with a backlash in a constant rotation range, and the first partially toothless gear 721 and the second partially toothless gear 722 are independently rotatable only within the range of the backlash.

The first partially toothless gear 721 and the second partially toothless gear 722 each include a first tooth missing portion 72x and a second tooth missing portion 72y on two regions in a circumferential direction. The first tooth missing portion 72x and the second tooth missing portion 72y reach a position where they are opposed to the conversion output gear 71 so as to temporarily release the connection of the conversion output gear 71 with the pair of partially toothless gears 721 and 722.

The first tooth missing portion 72x of the first partially toothless gear 721 and the first tooth missing portion 72x of the second partially toothless gear 722 are formed in a range overlapping viewed in a rotation shaft direction. Similarly, the second tooth missing portion 72y of the first partially toothless gear 721 and the second tooth missing portion 72y of the second partially toothless gear 722 are also formed in a range overlapping viewed in the rotation shaft direction.

However, since the first partially toothless gear 721 and the second partially toothless gear 722 independently rotate within the range of the backlash, the first tooth missing portion 72x of the first partially toothless gear 721 and the first tooth missing portion 72x of the second partially toothless gear 722 shift from a state where the whole of them overlap viewed in the rotation shaft direction of the pair of partially toothless gears 721 and 722 to a state where only a part of them overlaps. At this time, the second tooth missing portion 72y also shifts similar to the first tooth missing portion 72x.

The spring 723 has one end connected to the first partially toothless gear 721 and another end connected to the second partially toothless gear 722. The spring 723 applies an elastic torque on the pair of partially toothless gears 721 and 722, so as to relatively rotate the pair of partially toothless gears 721 and 722 within the range of the backlash. The spring 723 is an exemplary elastic member.

More specifically, the spring 723 applies the elastic torque on the pair of partially toothless gears 721 and 722 in a direction narrowing the overlapping range of the first tooth missing portion 72x of the first partially toothless gear 721 and the first tooth missing portion 72x of the second partially toothless gear 722 viewed in the rotation shaft direction.

The pair of partially toothless gears 721 and 722 receive the rotational power from the conversion output gear 71 of the first gear mechanism 701 to rotate. At this time, the pair of partially toothless gears 721 and 722 mesh with the conversion output gear 71 in a state where the directions of the first tooth missing portion 72x and the second tooth missing portion 72y of each of the partially toothless gears 721 and 722 are shifted within the range of the backlash.

Then, when the first tooth missing portion 72x and the second tooth missing portion 72y of the first partially toothless gear 721 are opposed to the conversion output gear 71, the first partially toothless gear 721 does not receive the power from the conversion output gear 71, while the first partially toothless gear 721 receives the elastic torque from the spring 723 so as to relatively rotate with respect to the second partially toothless gear 722 within the range of the backlash.

Similarly, when the first tooth missing portion 72x and the second tooth missing portion 72y of the second partially toothless gear 722 are opposed to the conversion output gear 71, the second partially toothless gear 722 does not receive the power from the conversion output gear 71, while the second partially toothless gear 722 receives the elastic torque from the spring 723 so as to relatively rotate with respect to the first partially toothless gear 721 within the range of the backlash.

As illustrated in FIGS. 5, 7, 10, and 11, the first partially toothless gear 721 includes two engaging portions 721a and 721b engageable with the displaced portion 75a of the actuator 75 when the displaced portion 75a is located on the first position P1. That is, the pair of partially toothless gears 721 and 722 are gears that each include identical number of tooth missing portions 72x and 72y to the number of the engaging portions 721a and 721b. The first partially toothless gear 721 is an exemplary input gear that receives the rotational power from the first gear mechanism 701 to rotate.

Figure 6:
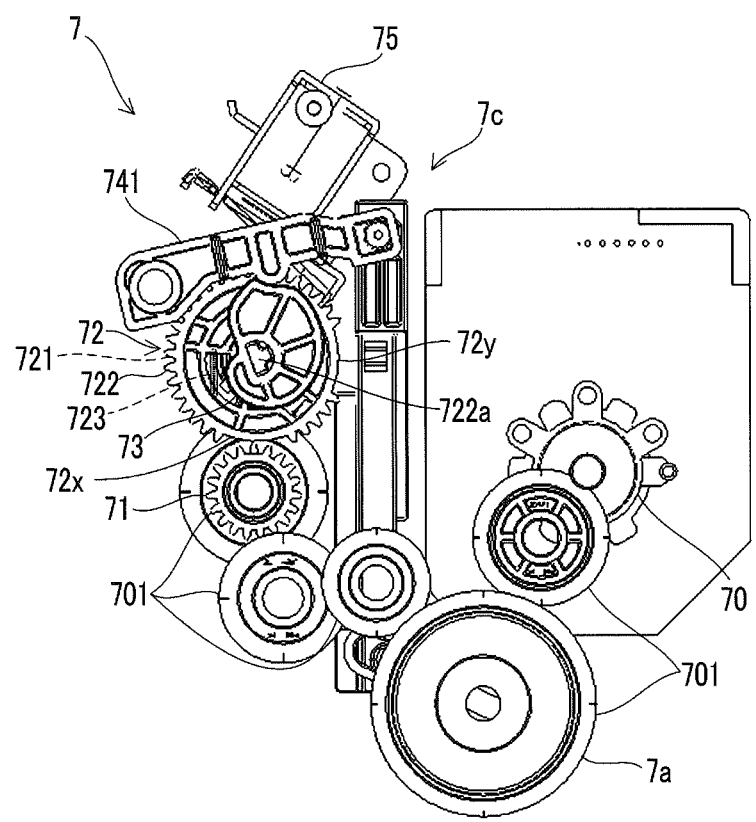
FIG. 6 illustrates the motion conversion mechanism and its peripheral portion in a back view when the driving mechanism according to the one embodiment is in the first state.
Figure 7:
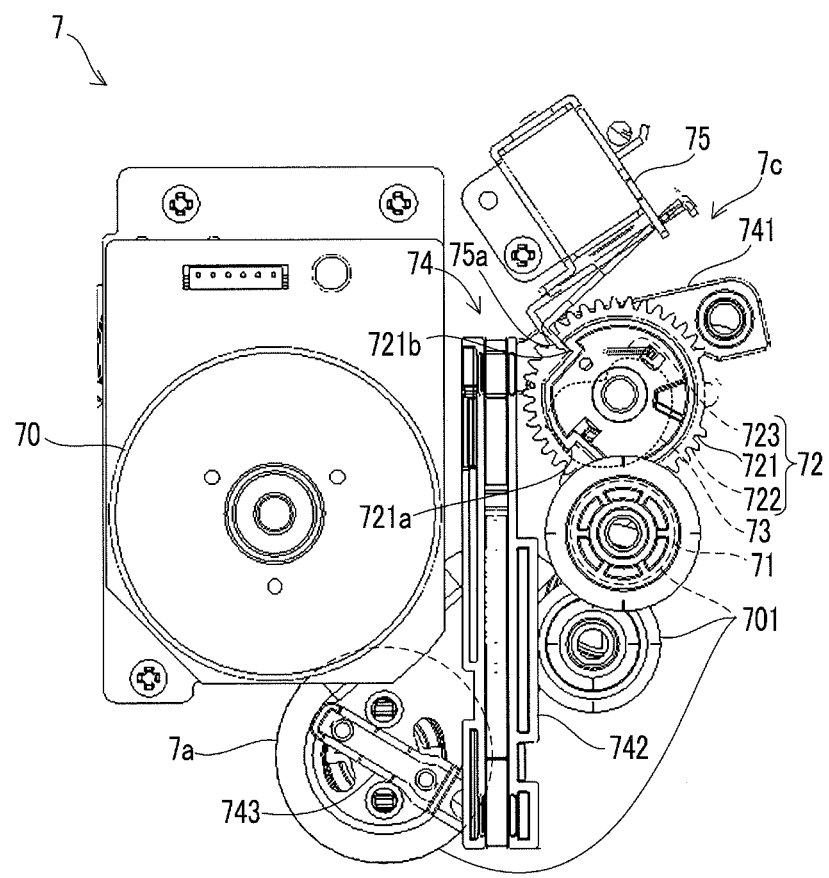
FIG. 7 illustrates the motion conversion mechanism and its peripheral portion in a front view when the driving mechanism according to the one embodiment is in the second state.

When the first tooth missing portion 72x of the first partially toothless gear 721 are opposed to the conversion output gear 71, the displaced portion 75a engages with the first engaging portion 721a as one of the two engaging portions 721a and 721b (see FIGS. 6 and 10). When the second tooth missing portion 72y of the first partially toothless gear 721 are opposed to the conversion output gear 71, the displaced portion 75a engages with the second engaging portion 721b as the other of the two engaging portions 721a and 721b (see FIG. 11). When the displaced portion 75a engages with the first engaging portion 721a or the second engaging portion 721b, the first partially toothless gear 721 halts the rotation.

As illustrated in FIG. 6, the cam 73 is connected to a shaft portion 722a of the second partially toothless gear 722. The cam 73 connects to the second partially toothless gear 722, such that rotating the second partially toothless gear 722 rotates the cam 73 and halting the second partially toothless gear 722 halts the cam 73.

Engaging the displaced portion 75a with one of the two engaging portions 721a and 721b halts the first partially toothless gear 721, thus causing one of the tooth missing portions 72x and 72y of the second partially toothless gear 722 to reach the position opposing the conversion output gear 71. At this time, the second partially toothless gear 722 halts against the force of the spring 723 due to the load applied on the cam 73 from a part of the link mechanism 74. This holds the second partially toothless gear 722 in a state where one of its tooth missing portions 72x and 72y are opposed to the conversion output gear 71.

The mechanical clutch 72 switches to the connected state and the non-connected state corresponding to whether or not each of the two engaging portions 721a and 721b engages with the displaced portion 75a of the actuator 75. The connected state is a state where the rotational power of the conversion output gear 71 is transmitted to the cam 73. The non-connected state is a state where the rotational power of the conversion output gear 71 is not transmitted to the cam 73.

A state of the motion conversion mechanism 7c and the driving mechanism 7 when the displaced portion 75a of the actuator 75 engages with the first engaging portion 721a is the first state. On the other hand, a state of the motion conversion mechanism 7c and the driving mechanism 7 when the displaced portion 75a of the actuator 75 engages with the second engaging portion 721b is the second state. In the first state and the second state, the mechanical clutch 72 is in the non-connected state.

A natural state of the mechanical clutch 72 is the connected state. When the displaced portion 75a is maintained on the second position P2, one of or both the pair of partially toothless gears 721 and 722 engage with the conversion output gear 71, so as to rotate the cam 73. When the displaced portion 75a transfers from the second position P2 to the first position P1, the displaced portion 75a engages with one of the engaging portions 721a and 721b that reaches the first position P1 first, so as to halt the rotation of the first partially toothless gear 721. This switches the mechanical clutch 72 from the connected state to the non-connected state, so as to halt the rotation of the cam 73.

As illustrated in FIGS. 10 and 11, the two engaging portions 721a and 721b are formed on a plurality of positions within a range of a first center angle θ1 in the circumferential direction of the first partially toothless gear 721. The first center angle θ1 is a default angle less than 180 degrees. In this embodiment, the first center angle θ1 is approximately 90 degrees. The first center angle θ1 is an exemplary default center angle.

In the following description, an angle obtained by subtracting the first center angle θ1 from 360 degrees is referred to as a second center angle θ2. In this embodiment, a ratio of the first center angle θ1 to the second center angle θ2 is approximately 1 to 3.

As described above, when the displaced portion 75a transfers to the first position P1 and the displaced portion 75a engages with each of the first engaging portion 721a and the second engaging portion 721b, the mechanical clutch 72 comes in the non-connected state so as to halt the cam 73.

On the other hand, when the displaced portion 75a transfers to the second position P2 to release the engagement of the displaced portion 75a with each of the first engaging portion 721a and the second engaging portion 721b, the spring 723 of the mechanical clutch 72 applies the elastic torque on the halting first partially toothless gear 721 so as to rotate the first partially toothless gear 721 until coming to a state where the first partially toothless gear 721 meshes with the conversion output gear 71. This causes the mechanical clutch 72 to be in the connected state. That is, the first partially toothless gear 721 rotates again, and the second partially toothless gear 722 also rotates in conjunction with the first partially toothless gear 721. As a result, the cam 73 also rotates.

The link mechanism 74 is a mechanism that connects to the cam 73 to convert the rotating movement of the cam 73 to the reciprocatingly displacing movement. The link mechanism 74 includes a first swinging portion 741, an elevating portion 742, and a second swinging portion 743.

The first swinging portion 741 is turnably supported in a state of contacting the cam 73, so as to swing up and down by the rotation of the cam 73. The first swinging portion 741 applies the load on the cam 73. As described above, the load halts the second partially toothless gear 722 against the force of the spring 723.

That is, when the plurality of tooth missing portions 72x and 72y in the first partially toothless gear 721 are each opposed to the conversion output gear 71, the displaced portion 75a located on the first position P1 engages with each of the plurality of engaging portions 721a and 721b so as to halt the rotation of the first partially toothless gear 721 (see FIGS. 5, 7, 10, and 11).

Furthermore, when the rotation of the first partially toothless gear 721 halts, the second partially toothless gear 722 halts against the elastic torque due to the load that the cam 73 receives from the first swinging portion 741 in a state where the plurality of tooth missing portions 72x and 72y of the second partially toothless gear 722 are each opposed to the conversion output gear 71 (see FIG. 6). This causes the mechanical clutch 72 to be in the non-connected state.

Furthermore, when the displaced portion 75a displaces from the first position P1 to the second position P2, the first partially toothless gear 721 is rotated by the elastic torque to the direction connecting to the conversion output gear 71. Then, the rotation of the first partially toothless gear 721 connecting to the conversion output gear 71 causes the second partially toothless gear 722 to rotate to the direction connecting to the conversion output gear 71 in conjunction with the first partially toothless gear 721. This causes the mechanical clutch 72 to be in the connected state.

The elevating portion 742 has an upper end side portion connected to the first swinging portion 741. The swing of the first swinging portion 741 displaces the elevating portion 742 up and down. The second swinging portion 743 is connected to a lower end side portion of the elevating portion 742. The second swinging portion 743 swings in conjunction with the displacement of the elevating portion 742 in a vertical direction.

When the driving mechanism 7 is in the first state, the cam 73 holds the elevating portion 742 of the link mechanism 74 on a position on a Top Dead Center (TDC) side (see FIG. 5). When the driving mechanism 7 is in the second state, the cam 73 holds the elevating portion 742 of the link mechanism 74 on a position on a Bottom Dead Center (BAD) side.

As illustrated in FIGS. 8 and 9, the second swinging portion 743 includes a tapered surface 743*a* along the circumferential direction of the relay shaft 703. The tapered surface 743*a* is in contact with a part of an interposing member 744 interposing between the relay gear 7*b* and the second swinging portion 743.

In the examples illustrated in FIGS. 8 and 9, the second swinging portion 743 is constituted of two combined members.

When the driving mechanism 7 transfers from the second state to the first state, the tapered surface 743*a* turns in a first turning direction having the relay shaft 703 as the center, so as to displace the interposing member 744 and the relay gear 7*b*, which are pushed by the tapered surface 743*a*, to the relay output gear 7*a* side. This displaces the relay gear 7*b* to the connected position, thus engaging the engaging portion 7*a*1 of the relay output gear 7*a* with the engaging portion 7*b*1 of the relay gear 7*b* (see FIG. 8).

On the other hand, when the driving mechanism 7 transfers from the first state to the second state, the tapered surface 743*a* turns in a second turning direction opposite to the first turning direction, so as to reduce the restriction of the position of the interposing member 744 and the relay gear 7*b* by the tapered surface 743*a*.

The relay gear 7*b* receives an elastic force by a spring (not illustrated) in a direction separating from the relay output gear 7*a*. Therefore, when the driving mechanism 7 transfers from the first state to the second state, the force of the spring displaces the interposing member 744 and the relay gear 7*b* to the opposite side of the relay output gear 7*a* side. This displaces the relay output gear 7*a* to the disconnected position, thus releasing the engagement of the engaging portion 7*a*1 of the relay output gear 7*a* with the engaging portion 7*b*1 of the relay gear 7*b* (see FIG. 9).

When the driving mechanism 7 is in the first state, the power of the motor 70 is transmitted to the rotating unit 430 of the regular use developing unit 43*a* by the first gear mechanism 701. Simultaneously, the power of the motor 70 is also transmitted to the rotating units 430 of the other developing units 43*b* by the relay output gear 7*a*, the relay gear 7*b*, and the second gear mechanism 702.

On the other hand, when the driving mechanism 7 is in the second state, the power of the motor 70 is transmitted to the rotating unit 430 of the regular use developing unit 43*a* by the first gear mechanism 701. However, the displacement of the relay output gear 7*a* to the disconnected position prevents the power of the motor 70 from being transmitted to the rotating units 430 of the other developing units 43*b*.

When the driving mechanism 7 is in the first state, the link mechanism 74 holds the intermediate transfer belt 48 on the color position. When the driving mechanism 7 is in the second state, the link mechanism 74 holds the intermediate transfer belt 48 on the monochrome position.

That is, the motion conversion mechanism 7*c* of the driving mechanism 7 doubles as a mechanism that displaces the intermediate transfer belt 48 to the color position and the monochrome position.

For example, assume that the elevating portion 742 is connected to the support frame 485. This displaces the support frame 485 in the vertical direction corresponding to the displacement of the elevating portion 742.

The color positioning operation of the driving mechanism 7 is an operation that temporarily displaces the displaced portion 75*a* of the actuator 75 to the second position P2 and returns to the first position P1 at a timing catching on the first engaging portion 721*a*.

Similarly, the monochrome positioning operation of the driving mechanism 7 is an operation that temporarily displaces the displaced portion 75*a* of the actuator 75 to the second position P2 and returns to the first position P1 at a timing catching on the second engaging portion 721*b*.

When the control unit 8 transfers the motion conversion mechanism 7*c* to the first state, the control unit 8 outputs a first control signal to the actuator 75. The first control signal is the control signal that displaces the displaced portion 75*a* from the first position P1 to the second position P2, subsequently causes the displaced portion 75*a* to stay on the second position P2 during a predetermined position maintenance time period T1, and further displaces the displaced portion 75*a* from the second position P2 to the first position P1. The first state is an exemplary reference state.

The position maintenance time period T1 is a time period required for the first partially toothless gear 721 to rotate by an angle larger than the first center angle θ1 and smaller than the second center angle θ2. Here, when the time period required for one rotation of the first partially toothless gear 721 is T0, the position maintenance time period T1 satisfies the following formula (1).

$$(\theta 1/360)T0 < T1 < \{(360-\theta 1)/360\}T0 \qquad (1)$$

The control unit 8 controls the actuator 75 as described above, such that the motion conversion mechanism 7*c* always transfers to the first state even if the motion conversion mechanism 7*c* is in any state of the first state and the second state.

On the other hand, when the control unit 8 transfers the motion conversion mechanism 7*c* from the first state to the second state, the control unit 8 outputs a second control signal to the actuator 75. The second control signal is the control signal that displaces the displaced portion 75*a* from the first position P1 to the second position P2, subsequently displaces the displaced portion 75*a* from the second position P2 to the first position P1 before an excess time period T2 passes.

The excess time period T2 is a time period required for the first partially toothless gear 721 to rotate by an angle of the first center angle θ1. When the time period required for one rotation of the first partially toothless gear 721 is T0, the excess time period T2 is expressed by the following formula (2).

$$T2 = (\theta 1/360)T0 \qquad (2)$$

For example, when the first center angle θ1 is 90 degrees, the position maintenance time period T1 is longer than (T0/4) and shorter than (3T0/4). Furthermore, the excess time period T2 is (T0/4).

The control unit 8 outputs the second control signal after outputting the first control signal, thus always transferring the motion conversion mechanism 7*c* to the second state.

Accordingly, employing the driving mechanism 7 ensures controlling the state of the motion conversion mechanism 7*c* and driving mechanism 7 in the desired state without a sensor obtaining the state of the motion conversion mechanism 7*c*.

In the driving mechanism 7, the load applied on the relay gear 7b, which drives the three rotating units 430 of the other developing units 43b, is large. On the other hand, the load applied on the mechanical clutch 72 is a relatively small load required for displacing the relay gear 7b. Therefore, the driving mechanism 7 does not require a large-sized clutch.

Furthermore, in the driving mechanism 7, the respective components of the motion conversion mechanism 7c are positioned on a plurality of positions mechanically predetermined with high accuracy. In this embodiment, the relay gear 7b is positioned on the connected position and the disconnected position with high accuracy.

Furthermore, the elevating portion 742 is positioned on two positions of upper and lower with high accuracy. Therefore, the intermediate transfer belt 48 is positioned on the color position and the monochrome position with high accuracy.

Application Example

In the driving mechanism 7, the first partially toothless gear 721 of the mechanical clutch 72 may include three or more engaging portions 721a and 721b. This ensures the respective components of the motion conversion mechanism 7c to be positioned on predetermined three or more positions with high accuracy.

In the image forming apparatus 10, the driving mechanism 7 may be applied to a sheet table elevating mechanism. The sheet table elevating mechanism is a mechanism that displaces a sheet table on which the sheet 9 is placed in the vertical direction in the sheet cassette 21.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A driving mechanism comprising:
   a first gear mechanism connected to a motor to transmit a rotational power of the motor to a first drive target;
   a motion conversion mechanism that converts a rotational motion with one rotation of the first gear mechanism to one reciprocation motion when the motion conversion mechanism receives the rotational power from the first gear mechanism, the motion conversion mechanism transmitting a power of the reciprocation motion to a reciprocatingly displaceable reciprocation drive target;
   an actuator that includes a displaceable displaced portion, the actuator displacing the displaced portion to a first position and a second position corresponding to an input control signal; and
   a mechanical clutch that includes an input gear, the input gear rotating by receiving the rotational power from the first gear mechanism, the input gear including a plurality of engaging portions engageable with the displaced portion on the first position, the mechanical clutch switching to a connected state and a non-connected state corresponding to whether or not the engaging portions each engage with the displaced portion of the actuator, the connected state being a state where the rotational power of the first gear mechanism is transmitted to the motion conversion mechanism, the non-connected state being a state where the rotational power of the first gear mechanism is not transmitted to the motion conversion mechanism,
   wherein the plurality of engaging portions are formed on a plurality of positions within a range of a default center angle less than 180 degrees in a circumferential direction of the input gear,
   the motion conversion mechanism includes:
      a cam; and
      a swinging portion turnably supported in a state of contacting the cam so as to apply a load on the cam,
   the mechanical clutch includes:
      a pair of partially toothless gears that coaxially overlap to be connected to one another with a backlash in a constant rotation range, rotate connecting to a conversion output gear as a part of the first gear mechanism, and each include a plurality of tooth missing portions that temporarily release the connection to the conversion output gear; and
      an elastic member that applies an elastic torque on the pair of partially toothless gears so as to relatively rotate the pair of partially toothless gears within the range of the backlash,
   a first partially toothless gear as one of the pair of partially toothless gears is the input gear that includes a plurality of the engaging portions,
   a second partially toothless gear as another of the pair of partially toothless gears is connected to the cam,
   when the plurality of tooth missing portions of the first partially toothless gear are each opposed to the conversion output gear, the displaced portion located on the first position engages with each of the plurality of engaging portions to halt the rotation of the first partially toothless gear,
   when the rotation of the first partially toothless gear halts, the second partially toothless gear halts against the elastic torque due to a load that the cam receives from the swinging portion in a state where the plurality of tooth missing portions of the second partially toothless gear are each opposed to the conversion output gear,
   when the displaced portion is displaced from the first position to the second position, the first partially toothless gear is rotated by the elastic torque to a direction connecting to the conversion output gear, and
   the rotation of the first partially toothless gear connecting to the conversion output gear causes the second partially toothless gear to rotate to the direction connecting to the conversion output gear in conjunction with the first partially toothless gear.

2. The driving mechanism according to claim 1, further comprising:
   a relay gear rotatably supported, the relay gear being displaceable between a connected position and a disconnected position, the connected position being a position where the relay gear receives the rotational power from the first gear mechanism to rotate, the disconnected position being a position where the relay gear does not receive the rotational power from the first gear mechanism; and
   a second gear mechanism that transmits the rotational power of the relay gear to a second drive target,
   wherein two of the engaging portions are formed on the input gear, and
   the relay gear is the reciprocation drive target to which the power is transmitted from the motion conversion mechanism.

3. An image forming apparatus comprising:
   a plurality of image carriers each having a surface on which an electrostatic latent image is formed;

a plurality of developing units developing the electrostatic latent images on the respective plurality of image carriers as black toner images and plurality of other colored toner images;

a motor as a driving source shared by the plurality of developing units;

the driving mechanism according to claim 2 that transmits the rotational power of the motor to rotating units included in the plurality of developing units;

a control unit that outputs the control signal to the actuator of the driving mechanism; and an intermediate transfer belt on which the toner images on the plurality of image carriers are transferred, wherein a first drive target is the rotating unit included in one developing unit that performs the development of the black toner images, a second drive targets are the rotating units included in the other developing units that perform the development of the colored toner images, when the control unit transfers the motion conversion mechanism to a predetermined reference state, the control unit outputs the control signal to the actuator so as to displace the displaced portion from the first position to the second position, subsequently causes the displaced portion to stay on the second position during a predetermined position maintenance time period, and further displaces the displaced portion from the second position to the first position, the position maintenance time period is a time period required for the input gear to rotate by an angle larger than the default center angle and smaller than an angle obtained by subtracting the default center angle from 360 degrees, the intermediate transfer belt is displaceably supported between a color position where the intermediate transfer belt contacts all the plurality of the image carriers and a monochrome position where the intermediate transfer belt contacts only one image carrier that performs the development of the black toner image, and the motion conversion mechanism of the driving mechanism doubles as a mechanism that displaces the intermediate transfer belt to the color position and the monochrome position.

* * * * *